United States Patent
Lee et al.

(10) Patent No.: US 9,653,751 B2
(45) Date of Patent: May 16, 2017

(54) LITHIUM BATTERY

(71) Applicant: Samsung SDI Co., Ltd., Yongin-si, Gyeonggi-do (KR)

(72) Inventors: So-Ra Lee, Yongin-si (KR); Chang-Su Shin, Yongin-si (KR); Yu-Jeong Cho, Yongin-si (KR); Su-Kyung Lee, Yongin-si (KR); Jae-Myung Kim, Yongin-si (KR); Ui-Song Do, Yongin-si (KR); Sang-Eun Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 697 days.

(21) Appl. No.: 13/801,513

(22) Filed: Mar. 13, 2013

(65) Prior Publication Data

US 2014/0079991 A1 Mar. 20, 2014

(30) Foreign Application Priority Data

Sep. 20, 2012 (KR) .................. 10-2012-0104616

(51) Int. Cl.
| | | |
|---|---|---|
| *H01M 10/056* | (2010.01) | |
| *H01M 4/38* | (2006.01) | |
| *H01M 4/36* | (2006.01) | |
| *H01M 4/133* | (2010.01) | |
| *H01M 4/134* | (2010.01) | |
| *H01M 4/583* | (2010.01) | |
| *H01M 10/052* | (2010.01) | |
| *H01M 10/0567* | (2010.01) | |
| *H01M 10/0568* | (2010.01) | |

(52) U.S. Cl.
CPC ......... *H01M 10/056* (2013.01); *H01M 4/133* (2013.01); *H01M 4/134* (2013.01); *H01M 4/366* (2013.01); *H01M 4/38* (2013.01); *H01M 4/386* (2013.01); *H01M 4/583* (2013.01); *H01M 10/052* (2013.01); *H01M 10/0567* (2013.01); *H01M 10/0568* (2013.01); *Y02T 10/7011* (2013.01)

(58) Field of Classification Search
CPC .............................. H01M 4/133; H01M 4/134
USPC ........................................................ 429/206
See application file for complete search history.

(56) References Cited

U.S. PATENT DOCUMENTS

| | | | |
|---|---|---|---|
| 2002/0039677 A1* | 4/2002 | Iwamoto ........... | H01M 10/0567 429/122 |
| 2003/0148184 A1* | 8/2003 | Omaru .................... | H01M 4/13 429/231.95 |
| 2006/0166093 A1 | 7/2006 | Zaghib et al. | |
| (Continued) | | | |

FOREIGN PATENT DOCUMENTS

JP 2009-512160 3/2009

OTHER PUBLICATIONS

Office Action mailed Jun. 2, 2016, issued in corresponding KR 10-2012-0104616.

*Primary Examiner* — Basia Ridley
*Assistant Examiner* — James Erwin
(74) *Attorney, Agent, or Firm* — Knobbe Martens Olson & Bear LLP

(57) ABSTRACT

Provided is a lithium battery including: a positive electrode, a negative electrode, and an organic electrolytic solution, wherein the negative electrode has a metal/metalloid nanostructure, and the organic electrolytic solution includes a lithium sulfonimide-based compound.

15 Claims, 4 Drawing Sheets

(56) References Cited

U.S. PATENT DOCUMENTS

| | | | |
|---|---|---|---|
| 2008/0268338 A1* | 10/2008 | Lee | H01M 4/06 |
| | | | 429/218.1 |
| 2008/0311464 A1 | 12/2008 | Krause et al. | |
| 2010/0092869 A1 | 4/2010 | Kaneko et al. | |
| 2010/0159334 A1 | 6/2010 | Kashima et al. | |
| 2010/0285373 A1 | 11/2010 | Horikawa | |
| 2010/0297502 A1 | 11/2010 | Zhu et al. | |
| 2011/0081583 A1 | 4/2011 | Sugimoto et al. | |
| 2011/0111308 A1 | 5/2011 | Halalay et al. | |
| 2011/0200883 A1* | 8/2011 | Cui | H01M 4/049 |
| | | | 429/231.4 |

* cited by examiner

LITHIUM BATTERY

CROSS-REFERENCE TO RELATED APPLICATIONS

This application claims the benefit of Korean Patent Application No. 10-2012-0104616, filed on Sep. 20, 2012, in the Korean Intellectual Property Office, the disclosure of which is incorporated herein in its entirety by reference.

BACKGROUND

Field

One or more embodiments relate to a lithium battery.

Description of the Related Technology

Lithium secondary batteries have high voltage and high energy density and thus, are used in various applications. For example, electric vehicles (HEV or PHEV) require lithium secondary batteries with excellent discharge capacity and lifespan characteristics because they operate at high temperature, to be charged or discharged with a great amount of electricity, and to be used for a long period of time.

Carbonaceous materials are porous and thus, during charging and discharging, they undergo less volumetric change. However, due to the porous structure of carbonaceous materials, a battery using the carbonaceous material has a small battery capacity. For example, a theoretical capacity of graphite having high crystallinity is, when it has a composition of LiC6, 372 mAh/g.

As a negative active material having higher electric capacity than the carbonaceous materials, a lithium-alloyable metal may be used. For example, the lithium-alloyable metal may be Si, Sn, Al, or the like. However, the lithium-alloyable metal may be easily deteriorated and thus its lifespan characteristics may be poor. For example, in the case of Sn, during repeated charging and discharging, Sn particles may be repeatedly aggregated and crushed and thus, Sn particles may be electrically insulated.

Accordingly, there is a need to develop a lithium battery with improved discharge capacity and lifespan characteristics.

SUMMARY

One or more embodiments include a lithium battery including: a positive electrode, a negative electrode, and an organic electrolytic solution, wherein the negative electrode has a metal/metalloid nanostructure, and the organic electrolytic solution includes a lithium sulfonimide-based compound.

According to an aspect of the present embodiments, a lithium battery includes: a positive electrode; a negative electrode; and an organic electrolytic solution, wherein the negative electrode comprises a negative active material comprising metal/metalloid nanostructure, and the organic electrolytic solution comprises a lithium sulfonimide-based compound.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
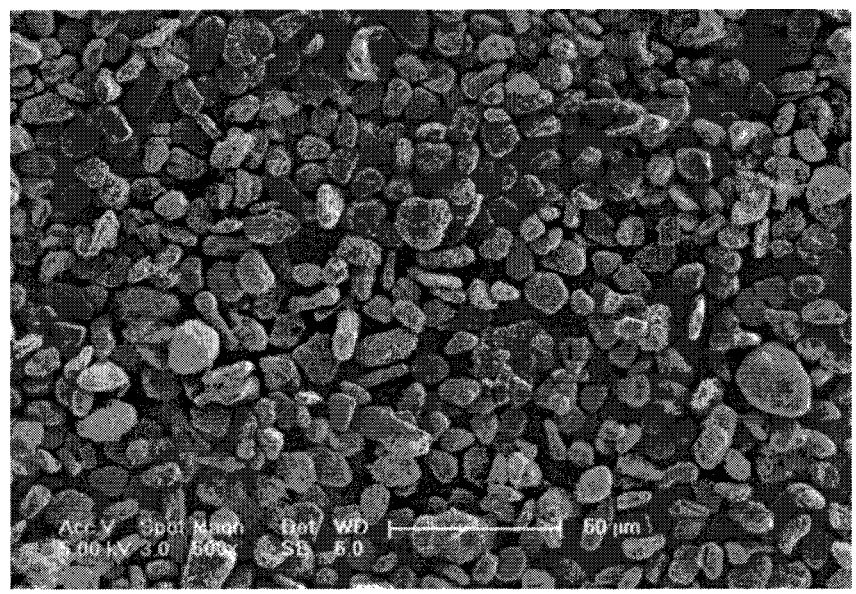
FIG. 1A is a scanning electron microscope (SEM) image of a composite negative active material prepared according to Preparation Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, lithium batteries according to embodiments are described in detail.

A lithium battery according to an embodiment includes a positive electrode, a negative electrode, and an organic electrolytic solution, wherein the negative electrode has a metal/metalloid nanostructure, and the organic electrolytic solution includes a lithium sulfonimide-based compound.

The negative electrode of the lithium battery includes a negative active material having a metal/metalloid nanostructure. In the lithium battery, a volumetric change of the negative active material during charging and discharging can be easily absorbed by the metal/metalloid nanostructure and side reactions between the negative active material and the organic electrolytic solution can be prevented by the inclusion of the lithium sulfonimide-based compound in the organic electrolytic solution thus, deterioration of the lithium battery can be prevented. Resultantly, discharge capacity and lifespan characteristics of the lithium battery may be improved.

The nanostructure of the lithium battery may have at least one structure selected from the group consisting of a nanowire, a nanotube, a nanobelt, and a nanorod, but is not limited thereto, and may be any other structure that has a nano-scaled size and is distinctive from nanoparticles.

For example, the nanostructure may be a nanowire. The "nanowire" refers to a wire structure having a cross-section with a diameter of a nanometer range. For example, a diameter of a cross section of the nanowire may be about 1 nm to about 500 nm, and a length thereof may be about 0.1 μm to about 100 μm. For example, the nanowire may have an aspect ratio of 5 or more, 10 or more, for example, 50 or more, or 100 or more. The diameter of the nanowire may be substantially uniform or variable, and at least a portion of a longer axis of the nanowire may be a straight line, or may be gently curved or sharply curved, or branched. The nanowire may easily absorb a volumetric change of the metal/metalloid material of a lithium battery during charging and discharging.

For example, the metal/metalloid nanostructure of the lithium battery may include at least one element selected from a Group 13 element, a Group 14 element, and a Group 15 element of a Periodic Table of elements. The "metal/ metalloid" refers to an element that intercalates or deintercalates lithium and is categorized as metal and/or metalloid in the Periodic Table of elements and is not carbon. For example, the metal/metalloid nanostructure may include an element selected from Al, Ga, In, Tl, Si, Ge, Sn, Pb, Sb, Bi, and a combination thereof.

For example, the metal/metalloid nanostructure may include at least one element selected from Si, Ge, and Sn.

The metal/metalloid nanostructure may be a silicon-based nanowire. In some embodiments, "silicon-based" means the inclusion of about 50 wt % or more of silicon (Si), for example, at least about 60 wt %, 70 wt %, 80 wt %, or 90 wt % of Si, or 100 wt % of Si. The silicon-based nanowire is not limited, and may include, for example, a material selected from Si, SiOx (0<x≤2), Si—Z alloy (where Z is alkali metal, alkali earth metal, a Group 13 element, a Group 14 element, a transition metal, a rare earth element, or a combination thereof, and is not Si), and a combination thereof. The element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. In addition, the silicon-based material, such as Si, SiOx, Si—Z alloy, or the like, may include amorphous silicon, crystalline (including monocrystalline and polycrystalline) silicon, or a combination thereof. Such silicon-based nanowires may be used alone or in combination thereof. For example, the silicon-based nanowire may be a Si nanowire for high capacity. The Si nanowire may additionally include a dopant for the improvement of conductivity. For example, the dopant may be a Group 13 element or a Group 15 element. For example, the dopant may be P, B, or the like.

The negative active material of the lithium battery may include a composite of a metal/metalloid nanostructure and a carbonaceous material. For example, the composite may be a composite negative active material that includes a carbonaceous substrate and a metal/metalloid nanostructure disposed on the carbonaceous substrate. For example, the metal/metalloid nanostructure of the composite may be a Si nanowire.

The Si nanowire of the composite may be prepared by directly growing the Si nanowire on the carbonaceous substrate, or by separately growing the Si nanowire and then, disposing the Si nanowire on the carbonaceous substrate. As an example of the disposing, the Si nanowire may be attached or bound to the carbonaceous substrate. The disposing of the Si nanowire on the carbonaceous substrate may be performed by using any known method, and is not limited. For example, a nanowire may be grown by vapor-liquid-solid (VLS) growth method, or a precursor gas is thermally decomposed near a nano-sized catalyst. When a Si nanowire is directly grown on a carbonaceous substrate, the growing may be performed in the presence or absence of metal catalyst. Examples of the metal catalyst are Pt, Fe, Ni, Co, Au, Ag, Cu, Zn, Cd, and the like.

For example, in the composite, an amount of the carbonaceous substrate may be about 60 to about 99 wt %, and an amount of the silicon-based nanowire may be about 1 to about 40 wt %.

The carbonaceous substrate of the composite may be spherical or plate. When the carbonaceous substrate is spherical, the circularity of the spherical carbonaceous substrate may be about 0.7 to about 1.0. Circularity is a measure of how differently an object is from a perfect circle, and may be 0 to 1, and when the circularity is nearer 1, the object is more similar to the ideal circle. For example, the circularity of the carbonaceous substrate may be about 0.8 to about 1.0.

Figure 1B:
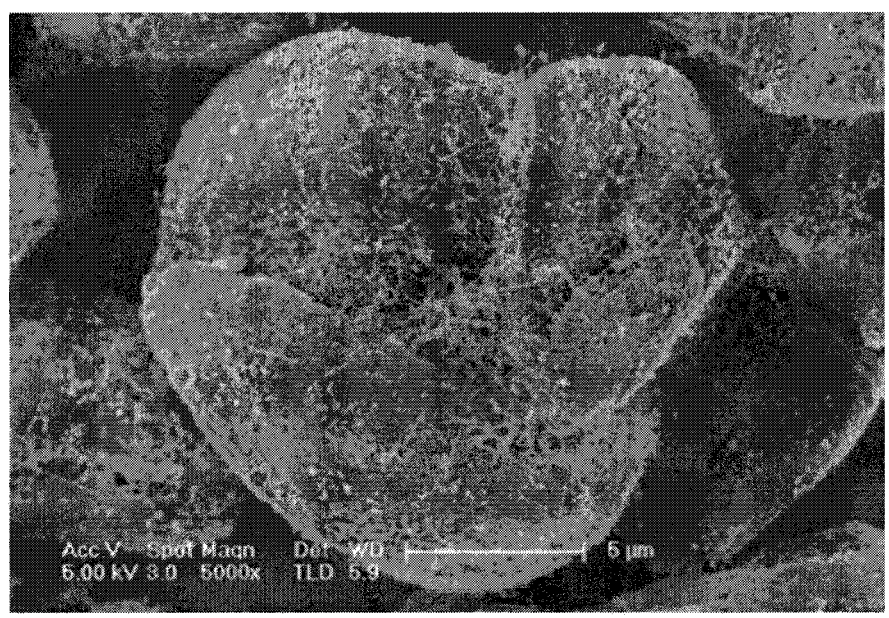
FIG. 1B is an enlarged image of FIG. 1A.
Figure 2A:
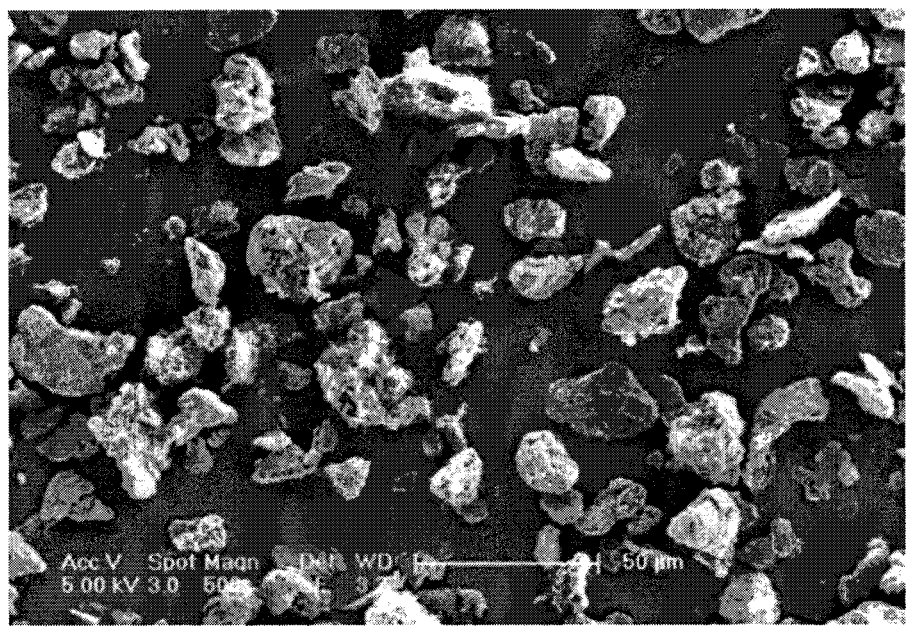
FIG. 2A is a SEM image of a composite negative active material prepared according to Preparation Example 2.
Figure 2B:
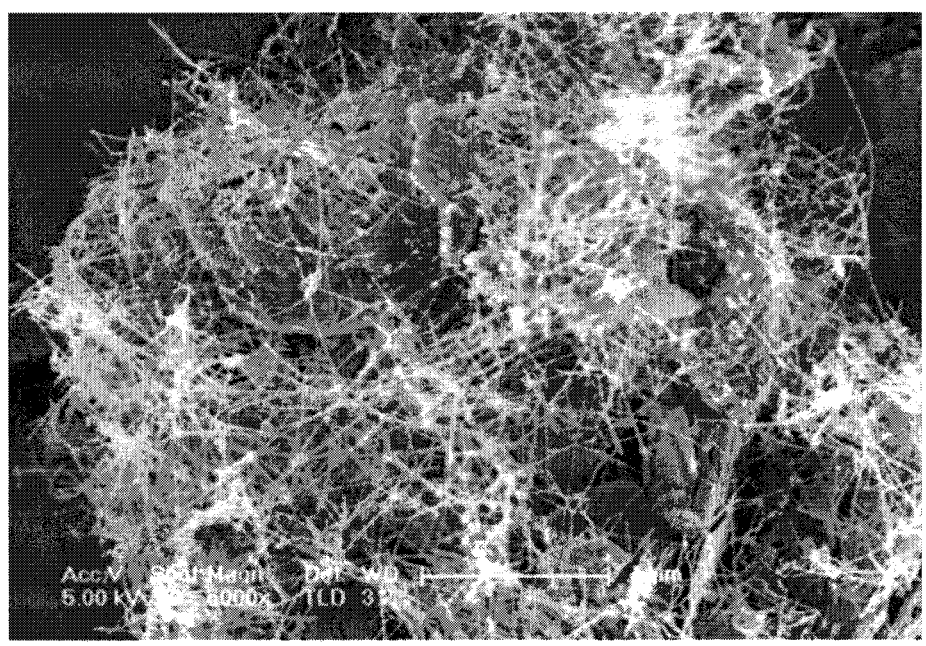
FIG. 2B is an enlarged image of FIG. 2A.

For example, the circularity of the carbonaceous substrate may be about 0.9 to about 1.0. A circularity of a tabular carbonaceous substrate may be less than 0.7. Examples of the spherical carbonaceous substrate are shown in FIGS. 1A and 1B, and examples of the tabular carbonaceous substrate are shown in FIGS. 2A and 2B.

The carbonaceous substrate may include at least one selected from the group consisting of natural graphite, artificial graphite, expanded graphite, graphene, carbon black, and fullerene soot, and is not limited to these materials and any other material used in the art may also be used to form the carbonaceous substrate. Natural graphite is naturally produced graphite, and examples thereof are flake graphite, high crystalline graphite, amorphous graphite, and the like. Artificial graphite is artificially synthesized graphite and is produced by heating amorphous carbon at high temperature, and examples thereof are primary graphite or electrographite, secondary graphite, graphite fiber, and the like. Expanded graphite is prepared by intercalating a chemical, such as an acid or an alkali, into between layers of graphite and heating the result to inflate a vertical layer of a molecular structure. Graphene is a single layer of graphite. Carbon black is a crystalline material with lower regularity than graphite, and when carbon black is heated for a long period of time at the temperature of about 3,000° C., the carbon black is changed into graphite. Fullerene soot is a carbon mixture including at least 3 wt % of fullerene that is a polygonal bundle compound consisting of 60 or more carbon atoms. These carbonaceous materials may be used alone or in combination in order to form the carbonaceous substrate. For example, natural graphite may be used in consideration of ease of an increase in electrode mixture density in preparing a negative electrode.

An average particle size of the carbonaceous substrate is not limited, and when the average particle size is too small, the carbonaceous substrate may have high reactivity with an electrolytic solution and cyclic characteristics of a lithium battery may decrease, and when the average particle size is too large, dispersion stability may decrease when a negative electrode slurry is formed and a formed negative electrode may have a rough surface. For example, an average particle size of the carbonaceous substrate may be about 1 μm to about 30 μm. For example, an average particle size of the carbonaceous substrate may be about 5 μm to about 25 μm, for example, about 10 μm to about 20 μm.

The carbonaceous substrate may act as a support for fixing a metal/metalloid nanostructure disposed thereon and may suppress a volumetric change of the metal/metalloid nanostructure during charging and discharging. The carbonaceous substrate may include a pore therein. Due to the inclusion of the pore, the volumetric change of the metal/metalloid nanostructure during charging and discharging may be effectively suppressed.

The negative active material of the lithium battery may further include, in addition to the negative active material including a metal/metalloid nanostructure, a carbonaceous material. The carbonaceous material may include at least one selected from the group consisting of natural graphite, artificial graphite, expanded graphite, graphene, carbon black, fullerene soot, carbon nanotube, and carbon fiber, and is not limited thereto and any other material used in the art may also be used as the carbonaceous material.

The lithium sulfonimide-based compound in the organic electrolytic solution of the lithium battery may have —S($=$O)$_2$— group bonded to a nitrogen atom in its molecular structure, and forms a salt with lithium. For example, the lithium sulfonimide-based compound may be lithiumfluoroalkylsulfoneimide, lithiumfluoroarylsulfoneimide, lithiumfluoroalkylarylsulfoneimide, or the like. For example, the lithium sulfonimide-based compound may include at least one selected from Li(FSO$_2$)$_2$N, Li(CF$_3$SO$_2$)$_2$N, Li(C$_2$F$_5$SO$_2$)$_2$N, LiN(C$_p$F$_{2p+1}$SO$_2$)(C$_q$F$_{2q+1}$SO$_2$) (p and q are different from each other, p and q are each independently an integer of 1 to 20), and Li(C$_6$F$_5$SO$_2$)$_2$N, and is not limited thereto and any other lithium sulfonimide-based compound used in the art may also be used herein.

An amount of the lithium sulfonimide-based compound in the organic electrolytic solution may be about 0.05M to about 2.0M. For example, the amount of the lithium sulfonimide-based compound may be about 0.1M to about 0.5M. When the amount of the lithium sulfonimide-based compound is too low, salt decomposition-induced cell deterioration may not be improved, and when the amount of the lithium sulfonimide-based compound is too high, dissolution of aluminum (Al) or decomposition of a negative electrode plate may occur by the sulfonimide-based compound.

The organic electrolytic solution of the lithium battery may further include, in addition to the lithium sulfonimide-based compound, a lithium salt that may react with the residual water molecules in an organic solvent in the organic electrolytic solution to produce at least one of a protonic acid and a Lewis acid.

For example, the organic electrolytic solution may include at least one lithium salt selected from the group consisting of LiBF$_4$, LiPF$_6$, LiAsF$_6$, LiSbF$_6$, LiPF$_3$(CF$_2$CF$_3$)$_3$, and LiPF$_6$. In addition, the organic electrolytic solution of the lithium battery may further include a typical lithium salt.

An amount of the lithium salt of the organic electrolytic solution may be about 0.01M to about 2.0M, but is not limited thereto, and the amount of the lithium salt may be appropriately controlled as long as a lithium battery shows improved lifespan characteristics.

For example, the organic electrolytic solution of the lithium battery may include LiPF$_6$ and the lithium sulfonimide-based compound.

An example of a method of manufacturing the lithium battery is described below.

First, the negative electrode may be prepared. The negative electrode includes the negative active material having the metal/metalloid nanostructure. For example, the negative electrode may be prepared by molding a negative active material composition including the negative active material having the metal/metalloid nanostructure into a certain shape, or by coating the negative active material composition on a current collect, such as a copper foil.

A negative active material composition including the negative active material having the metal/metalloid nanostructure, a conducting agent, a binder, and a solvent, which are mixed, is prepared. The negative active material composition is directly coated on a metal current collector to prepare a negative electrode plate. According to another embodiment, the negative active material composition is cast on a separator support and a film exfoliated from the support is laminated on a metal current collector to prepare a negative electrode plate. The method of forming the negative electrode is not limited thereto and any other method may also be used to form the negative electrode.

The negative electrode may include, as a negative active material, in addition to the negative active material including the metal/metalloid nanostructure, a typical negative active material.

For example, the negative electrode may further include at least one material selected from the group consisting of lithium metal, lithium-alloyable metal, transition metal oxide, non-transition metaloxide, and a carbonaceous material.

For example, the lithium-alloyable metal may be Si, Sn, Al, Ge, Pb, Bi, Sb Si—Y alloy (where Y is alkali metal, alkali earth metal, a Group 13 element, a Group 14 element, transition metal, rare earth element, or a combination thereof element and is not Si), or Sn—Y alloy (where Y is alkali metal, alkali earth metal, a Group 13 element, a Group 14 element, transition metal, rare earth element, or a combination thereof element and is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be a lithium titanium oxide, a vanadium oxide, or a lithium vanadium oxide.

For example, the transition metal oxide may be SnO$_2$, SiO$_x$ (0<x<2), or the like.

The carbonaceous material may be crystalline carbon, amorphous carbon, or mixture thereof. The crystalline carbon may be natural or artificial graphite that is amorphous, tabular, flake, circular, or fibrous, and the amorphous carbon may be soft carbon (cold calcined carbon) or hard carbon, meso-phase pitch carbide, or calcinded corks.

Examples of the conducting agent are acetylene black, ketjen black, natural graphite, artificial graphite, carbon black, carbon fiber, metal powder or fiber of copper, nickel, aluminum, or silver, and at least one of conductive materials, such as polyphenylene derivatives. However, the conducting agent is not limited thereto, and may be any one of various materials that are used as a conducting agent in the art. In addition, the crystalline carbonaceous material may be additionally used as a conducting agent.

As a binder, a vinylidene fluoride/hexafluoropropylene copolymer, polyvinylidenefluoride (PVDF), polyacrylonitrile, polymethylmetacrylate, polytetrafluoroethylene, a mixture thereof, or a styrene butadiene rubber-based polymer may be used, but the binder is not limited thereto, and any one of materials that are used as a binder in the art may be used herein.

As the solvent, N-methylpyrrolidone, acetone, or water may be used. However, the solvent is not limited thereto, and any one of various materials that are used in the art may be used herein.

Amounts of the negative active material, the conducting agent, the binder, and the solvent may be the same as used in a typical lithium battery. According to the purpose and structure of a lithium battery, one or more of the conducting agent, the binder, and the solvent may not need to be used.

Then, the positive electrode may be prepared.

An example of a method of manufacturing a positive electrode is described below.

A positive active material composition including a positive active material, a conducting agent, a binder, and a solvent is prepared. The positive active material composition is directly coated and dried on the metal current collector to prepare a positive electrode plate. According to another embodiment, the positive active material composition is cast on a separator support and a film exfoliated from the support is laminated on a metal current collector to prepare a positive electrode plate.

As the positive active material, at least one selected from a lithium cobalt oxide, a lithium nickel cobalt, manganese oxide, a lithium nickel cobalt aluminum oxide, a lithium iron phosphate oxide, and lithium manganese oxide may be used. However, the positive active material is not limited thereto. For example, any one of various materials that are used as a positive active material in the art may be used.

For example, a compound represented by any one of $Li_aA_{1-b}B_bD_2$ (wherein, $0.90 \leq a \leq 1.8$, and $0 \leq b \leq 0.5$); $Li_aE_{1-b}B_bO_{2-c}D_c$ (wherein, $0.90 \leq a \leq 1.8$, $0 \leq b \leq 0.5$, $0 \leq c \leq 0.05$); $LiE_{2-b}B_bO_{4-c}D_c$ (wherein, $0 \leq b \leq 0.5$, and $0 \leq c \leq 0.05$); $Li_aNi_{1-b-c}Co_bB_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, and $0 \leq d \leq 0.5$, $0.001 \leq e \leq 0.1$); $Li_aNiG_bO_2$ (wherein, $0.90 \leq a \leq 1.8$, $0.001 \leq b \leq 0.1$); $Li_aCoG_bO_2$ (wherein, $0.90 \leq a \leq 1.8$, $0.001 \leq b \leq 0.1$); $Li_aMnG_bO_2$ (wherein, $0.90 \leq a \leq 1.8$, and $0.001 \leq b \leq 0.1$); $Li_aMn_2G_bO_4$ (wherein, $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

These compounds may have a coating layer on their surfaces, or these compounds may be mixed with a compound having a coating layer. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed by using any one of various coating methods that are performed using the compounds and the elements and do not affect properties of the positive active material (For example, spray coating, immersion, or the like). These coating methods are obvious to one of ordinary skill in the art and thus, are not described in detail herein.

For example, $LiNiO_2$, $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $LiFeO_2$, $V_2O_5$, TiS, or MoS may be used.

The conducting agent, the binder, and the solvent included in the positive active material composition may be the same as those used in the negative active material composition. Also, a plasticizer may be further included in the positive active material composition and/or the negative active material composition to form pores in an electrode plate.

Amounts of the positive active material, the conducting agent, the binder, and the solvent may be the same as used in a typical lithium battery. According to the purpose and structure of a lithium battery, one or more of the conducting agent, the binder, and the solvent may not be used.

Then, a separator which is to be inserted between the positive electrode and the negative electrode is prepared.

The separator may be any one of various materials that are typically used in a lithium battery. A material for forming the separator may be a material that has low resistance to ion migration of an electrolyte and has excellent electrolytic solution retaining capability. For example, the separator forming material may be selected from glass fiber, polyester, Teflon, polyethylene, polypropylene, polytetrafluoroethylene (PTFE), and a combination thereof, each of which may be in a non-woven fabric or woven fabric form. For example, for use in a lithium ion battery, a rollable separator comprising polypropylene may be used, and for use in a lithium ion polymer battery, a separator that has excellent organic electrolytic solution-retaining capability may be used. For example, these separators may be prepared by using the following method.

A separator composition is prepared by mixing a polymer resin, a filler, and a solvent. The separator composition may be directly coated or dried on an electrode to complete the formation of the separator. Alternatively, the separator composition may be cast on a separate support and then a film separated from the support is laminated on an electrode, thereby completing the formation of the separator.

A polymer resin used in preparing the separator is not particularly limited, and any one of various materials that are used as a binder of an electrode plate may be used. For example, a vinylidene fluoride/hexafluoropropylene copolymer, polyvinylidenefluoride (PVDF), polyacrylonitrile, polymethylmetacrylate, or a mixture thereof may be used.

Then, an electrolyte is prepared. The electrolyte may be an organic electrolytic solution including a lithium sulfonimide-based compound.

The organic electrolytic solution may be prepared by dissolving the lithium sulfonimide-based compound and, optionally, other lithium salts in an organic solvent.

The organic solvent may be any one of various materials that are used as an organic solvent in the art. For example, the organic solvent may be propylene carbonate, ethylenecarbonate, fluoroethylenecarbonate, butylene carbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a mixture thereof. The organic solvent may be selected from propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofurane, 2-methyltetrahydrofurane, γ-butyrolactone, dioxorane, 4-methyldioxorane, N,N-dimethylformamide, dimethylacetamide, dimethylsufloxide, dioxane, 1,2-dimethoxyethane, sulforane, dichloroethane, chlorobenzene, nitrobenzene, diethyleneglycol, dimethylether, and a combination thereof.

The lithium salt may be any one of various materials that are used as a lithium salt in the art. Examples of the lithium salt are $LiPF_6$, $LiBF_4$, $LiSbF_6$, $LiAsF_6$, $LiClO_4$, $LiCF_3SO_3$, $LiC_4F_9SO_3$, $LiAlO_2$, $LiAlCl_4$, $LiCl$, $LiI$, and a mixture thereof.

Figure 4:
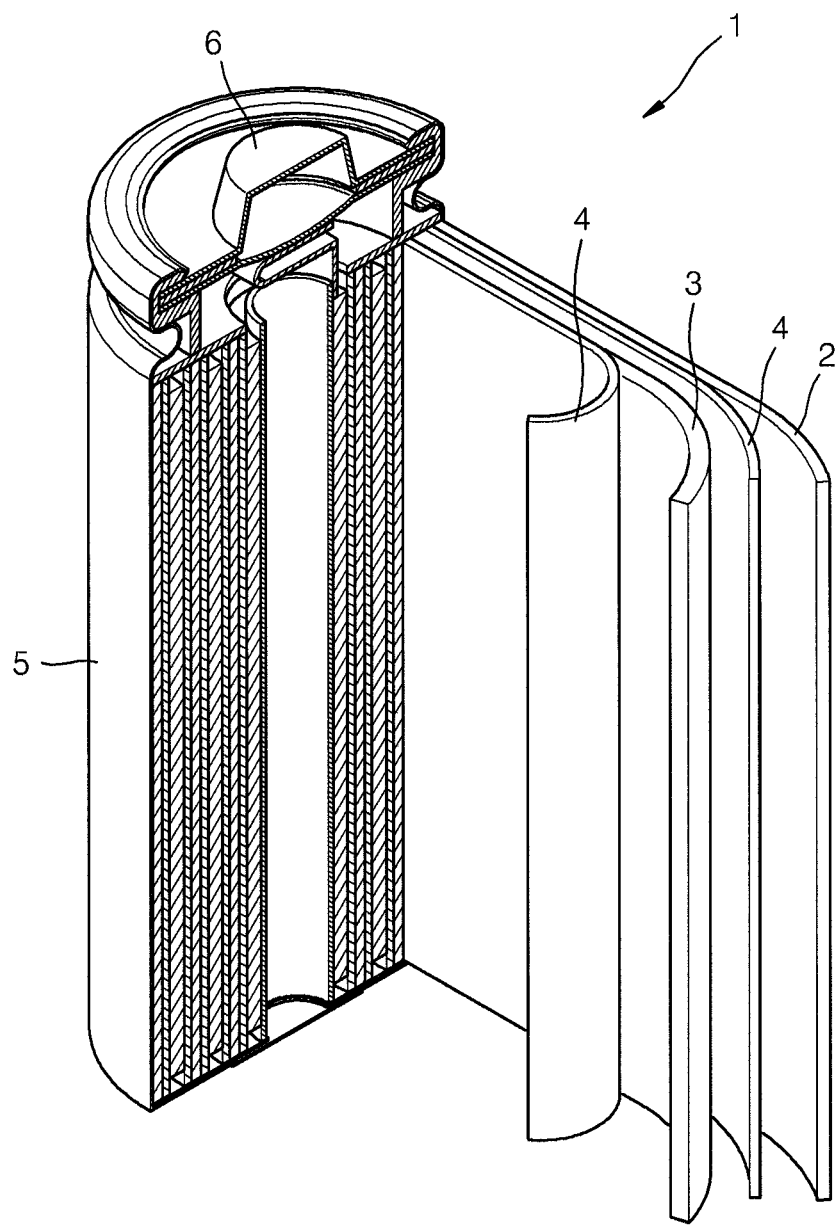
FIG. 4 is a schematic view of a lithium battery according to an embodiment.

Referring to FIG. 4, a lithium battery 1 includes a positive electrode 3, a negative electrode 2, and a separator 4. The positive electrode 3, the negative electrode 2, and the separator 4 are wound or folded to be placed in a battery case 5. Subsequently, an organic electrolytic solution is injected into the battery case 5, and the result structure is sealed with a cap assembly 6, thereby completing the manufacturing of the lithium battery 1. The battery case 5 may be cylindrical, rectangular, and thin-film shape. For example, the lithium battery 1 may be a thin-film battery. According to another embodiment, the lithium battery 1 may be a lithium ion battery.

A separator may be interposed between the positive electrode and the negative electrode to form a battery assembly. A plurality of battery assemblies may be stacked in a bi-cell structure and then impregnated with an organic electrolytic solution, and the obtained result is housed in a pouch, followed by sealing, thereby completing the manufacture of a lithium ion polymer battery.

Also, a plurality of battery assemblies may be stacked to form a battery pack, and the battery pack may be used in various devices that require high capacity and high power output. For example, the battery assemblies may be used in a notebook computer, a smartphone, an electric vehicle, or the like.

Due to its excellent high-rate characteristics and lifespan characteristics, the lithium battery may be suitable for use in an electric vehicle (EV). For example, the lithium battery is suitable for use in a hybrid car, such as a plug-in hybrid electric vehicle (PHEV).

The embodiments are described in detail with reference to Examples below. However, the one of more embodiments are examples only, and are not limited thereto.

Preparation of Negative Electrode and Lithium Battery

Preparation Example 1

Si nanowire (SiNW) was grown on a circular graphite by vapor-liquid-solid (VLS) method. In this regard, as the spherical graphite, spherical natural graphite (Hitachi Chemical company) having an average diameter of about 10 µm was used, and an Ag catalyst was disposed on the surface thereof, and then $SiH_4$ gas was supplied thereto at a temperature of 500° C. or higher to grow the Si nanowire, thereby preparing a composite negative active material.

Spherical graphite particles were arbitrarily collected and circularity thereof was measured with FPIA-3000, and the result was in a range of 0.808 to 1.000. Circularity values of the circular graphite are presented below:
Circularity: 0.808, 0.844, 0.861, 0.878, 0.879, 0.883, 0.884, 0.888, 0.891, 0.892, 0.907, 0.908, 0.913, 0.914, 0.916, 0.918, 0.922, 0.923, 0.924, 0.928, 0.929, 0.934, 0.935, 0.937, 0.938, 0.939, 0.942, 0.943, 0.946, 0.946, 0.947, 0.948, 0.949, 0.952, 0.956, 0.959, 0.961, 0.962, 0.963, 0.963, 0.963, 0.964, 0.964, 0.966, 0.967, 0.967, 0.970, 0.972, 0.976, 0.977, 0.977, 0.977, 0.979, 0.979, 0.982, 0.983, 0.984, 0.986, 0.990, 0.994, 0.995, 0.996, 1.000, 1.000

In addition, FIGS. 1A and 1B show field emission scanning electron microscope (FE-SEM) images of the circular graphite.

The circular graphite was a porous particle having pores therein, and showed a porosity of about 15 vol % based on the whole volume thereof. In addition, an average diameter of the grown Si nanowire may be about 30 to 50 nm, and an average length thereof was about 1.5 µm. An amount of the Si nanowire in the composite negative active material was 8.0 wt % based on a total weight of the composite negative active material.

Preparation Example 2

A negative active material was prepared in the same manner as in Example 1, except that SiNW was grown by using lump graphite obtained from Timcal company as a graphite substrate.

In addition, FIGS. 2A and 2B show FE-SEM images of the lump graphite.

As shown in FIGS. 2A and 2B, the lump graphite was tabular, and circularity thereof was in a range of 0.581 to 0.697. Circularity values of the Circular graphite are presented below:
Circularity: 0.581, 0.587, 0.616, 0.618, 0.638, 0.643, 0.643, 0.646, 0.647, 0.647, 0.658, 0.659, 0.663, 0.663, 0.663, 0.672, 0.674, 0.677, 0.689, 0.693, 0.694, 0.697, 0.697.

Preparation of Negative Electrode and Lithium Battery

Example 1

A mixture including the negative active material prepared according to Preparation Example 1 and graphite powder (Hitachi, MAG) at a weight ratio of 25:75 and a binder prepared by mixing styrene butadiene rubber (SBR) and carboxy methyl cellulose (CMC) at a weight ratio of 1:1 were mixed at a weight ratio of 97:3 in distilled water to prepare a negative active material slurry. The prepared slurry was coated on a copper foil current collector having a thickness of 10 µm to form a coating layer having a thickness of 90 µm to prepare a negative electrode plate, and the completed coated electrode plate was dried at the temperature of 165° C. for 3 hours and then pressed, thereby completing the manufacturing of a negative electrode having a thickness of 70 µm.

In addition, $LiCoO_2$ positive active material powder and a carbon conducting agent (Super-P; Timcal Ltd.) were uniformly mixed at a weight ratio of 90:5, and then, a polyvinylidene fluoride (PVDF) binder solution was added thereto to prepare a positive active material slurry having a weight ratio of active material:carbon conducting agent: binder=90:5:5. The active material slurry was coated on an aluminum foil having a thickness of 15 µm and dried to form a positive electrode plate, and additionally dried under vacuum conditions, thereby completing the manufacturing of a positive electrode. Thereafter, the positive electrode was pressed to have a thickness of 65 um.

The negative electrode was welded to a lower part of a 2032 coin cell and then subjected to discharging at the temperature of 145° C. in a vacuum oven for 5 hours, and then assembled with a 1 t (1 mm)-thickness spacer, a separator and the positive electrode, followed by injection with an electrolytic solution, thereby completing the manufacturing of a 2032 type coin cell.

In the manufacturing procedure of a cell, the positive electrode and the negative electrode were used, and as a separator, a polyethylene separator (STAR 20, Asahi) was used, and as an electrolyte, a mixed solvent including fluoroethylcarbonate (FEC) 8 wt %, 0.2M $LiPF_6$ and 0.9M lithium bis(fluorosulfonyl)imide (LiFSI, $Li(FSO_2)_2N$) dissolved in ethylene carbonate (EC):ethylmethylcarbonate (EMC):diethylcarbonate (DEC)(a volumetric ratio of 3:3:4).

Example 2

A lithium battery was manufactured in the same manner as in Example 1, except that 1.1M LiFSI was used instead of 0.2M LiPF$_6$ and 0.9M LiFSI.

Comparative Example 1

A lithium battery was manufactured in the same manner as in Example 1, except that 1.1M LiPF$_6$ was used instead of 0.2M LiPF$_6$ and 0.9M LiFSI.

Comparative Example 2

A mixture including Si nanoparticle 10 wt % having an average particle size of 300 nm, graphite powder 80 wt % having an average particle size of 5 μm, and a mesophase pitch (actual carbon ratio of 72%) 10 wt % was added to NMP (N-methyl pyrrolidone) solvent, and stirred by using a homogenizer three times, each for 10 minutes to prepare a slurry. The slurry was supplied to a spray drier at a speed of 3 g/sec while being sprayed in a chamber at an inner temperature of 120° C. to obtain a spray-dried powder. The dried powder was calcined in a nitrogen atmosphere at the temperature of 800° C. for 1 hour to prepare a composite negative active material powder having Si nanoparticle.

The composite negative active material powder and a binder prepared by mixing styrene butadiene rubber (SBR) and CMC at a weight ratio of 1:1 were mixed at a weight ratio of 97:3 in distilled water to prepare a negative active material slurry. The prepared slurry was coated on a copper foil current collector having a thickness of 10 μm to form a coating layer having a thickness of 90 μm to prepare a negative electrode plate, and the completed coated electrode plate was dried at the temperature of 165° C. for 3 hours and then pressed, thereby completing the manufacturing of a negative electrode having a thickness of 70 μm.

This negative electrode was used in the same manner as in Example 1 to manufacture a lithium battery.

Evaluation Example 1: Lifespan Characteristics Evaluation

The coin cells manufactured according to Examples 1 to 2 and Comparative Examples 1 to 2 were charged with a constant current at the temperature of 25° C. at a rate of 0.2 C rate until a voltage reached 4.3 V, and while 4.3V was maintained, the coin cells were charged at the constant voltage until the current reached 0.05 C. Subsequently, the coin cells were discharged with a constant current of 0.2 C rate until a voltage reached 2.75V.

Subsequently, the coin cells were charged with a constant current at 0.5 C rate until a voltage reached 4.3V, and while 4.3V was maintained, the coin cells were charged at the constant voltage until the current reached 0.05 C. Subsequently, the coin cells were discharged with a constant current of 0.5 C rate until the voltage reached 2.75V (vs. Li) (formation process).

Subsequently, the coin cells, which had experienced the formation process, were charged with a constant current at 1.0 C rate at a temperature of 25° C. until a voltage reached 4.3V, and while 4.3V was maintained, the coin cells were charged at a constant voltage until the current reached 0.05 C rate. Subsequently, the coin cells were discharged with a constant current of 1.0 C rate until a voltage reached 2.75V. This charging and discharging cycle was repeatedly performed 40 times.

Figure 3:
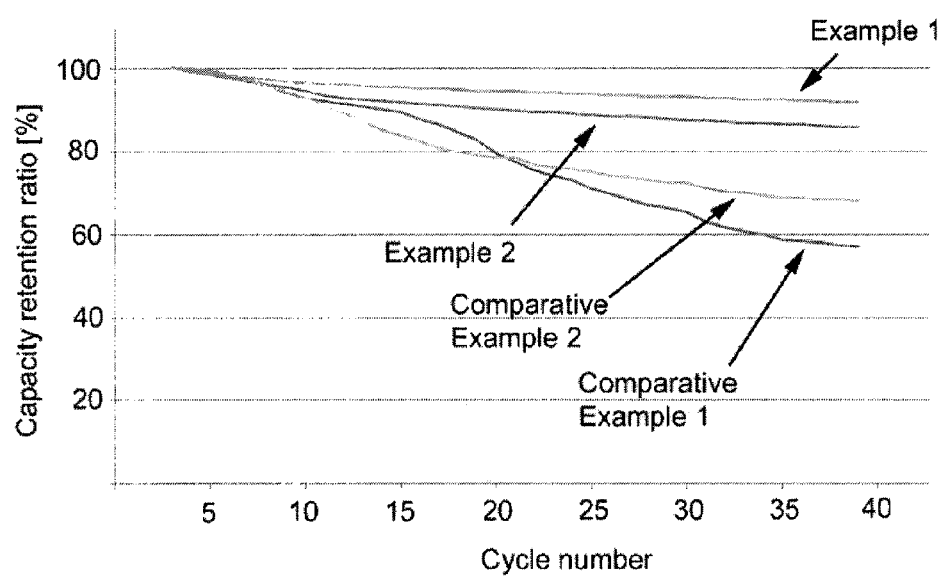
FIG. 3 is a graph showing lifespan characteristics of lithium batteries manufactured according to Examples 1 to 2 and Comparative Examples 1 to 2.

The charging and discharging test results are shown in Table 1 and FIG. 3. Capacity retention ratio is represented by Equation 1.

<Equation 1>

Capacity retention ratio=[discharge capacity in $40^{th}$ cycle/ discharge capacity in $1^{st}$]×100

TABLE 1

| | Capacity retention ratio in $40^{th}$ cycle [%] |
|---|---|
| Example 1 | 92 |
| Example 2 | 85 |
| Comparative Example 1 | 58 |
| Comparative Example 2 | 69 |

As shown in Table 1 and FIG. 3, the lithium batteries prepared according to Examples 1 and 2 showed substantially improved lifespan characteristics compared to lithium batteries manufactured according to Comparative Examples 1 and 2.

In particular, the lithium batteries of Examples 1 and 2 including the metal/metalloid nanostructure showed improved lifespan characteristics compared to the lithium battery of Comparative Example 2 including only a metal/metalloid nanoparticle.

According to embodiments, due to the inclusion of a negative electrode having a metal/metalloid nanostructure and an organic electrolytic solution containing a lithium sulfonimide-based compound, a formed lithium battery may have discharge capacity and lifespan characteristics.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:
1. A lithium battery comprising:
a positive electrode; a negative electrode; and an organic electrolytic solution, wherein
the positive electrode comprises a positive active material comprising lithium metal oxide,
the negative electrode comprises a negative active material comprising a composite comprising a metal/metalloid nanostructure and a porous carbonaceous material,
the organic electrolytic solution comprises a lithium sulfonimide-based compound and a lithium salt that reacts with the residual water molecules in an organic solvent in the organic electrolytic solution to produce at least one of a protonic acid and a Lewis acid,
wherein the metal/metalloid nanostructure has at least one type of a structure selected from a nanowire, a nanotube, a nanobelt, and a nanorod,
wherein the metal/metalloid nanostructure comprises at least one element selected from Si, Ge and Sn, and
wherein the lithium sulfonimide-based compound comprises at least one selected from the group consisting of lithiumfluoroalkylsulfonimide, lithiumfluoroarylsulfonimide, and lithiumfluoroalkylarylsulfonimide.
2. The lithium battery of claim 1, wherein the metal/metalloid nanostructure is a nanowire.

3. The lithium battery of claim 1, wherein the metal/metalloid nanostructure comprises at least one element selected from a Group 13 element, a Group 14 element, and a Group 15 element.

4. The lithium battery of claim 1, wherein the nanostructure is a Si nanowire.

5. The lithium battery of claim 1, wherein the composite comprises:
the carbonaceous material; and
the metal/metalloid nanostructure disposed on the carbonaceous material.

6. The lithium battery of claim 5, wherein the nanostructure is a nanowire.

7. The lithium battery of claim 5, wherein the carbonaceous substrate is spherical or tabular.

8. The lithium battery of claim 7, wherein the carbonaceous substrate is spherical and has a circularity of about 0.7 to about 1.0.

9. The lithium battery of claim 5, wherein the carbonaceous substrate comprises at least one selected from the group consisting of natural graphite, artificial graphite, expanded graphite, graphene, carbon black, and fullerene soot.

10. The lithium battery of claim 1, wherein the negative active material comprises at least one selected from the group consisting of natural graphite, artificial graphite, expanded graphite, graphene, carbon black, fullerene soot, carbon nanotube, and carbon fiber.

11. The lithium battery of claim 1, wherein the lithium sulfonimide-based compound comprises at least one selected from $Li(C_6F_5SO_2)_2$, $Li(FSO_2)_2N$, $Li(CF_3SO_2)_2N$, $Li(C_2F_5SO_2)_2N$, and $LiN(C_pF_{2p+1}SO_2)(C_qF_{2q+1}SO_2)$,
wherein p and q are different from each other, p and q are each independently an integer of 1 to 20.

12. The lithium battery of claim 1, wherein an amount of the lithium sulfonimide-based compound in the organic electrolytic solution is about 0.05M to about 2.0M.

13. The lithium battery of claim 1, wherein the lithium salt comprises at least one lithium salt selected from the group consisting of $LiBF_4$, $LiPF_6$, $LiAsF_6$, $LiSbF_6$, and $LiPF_3(CF_2CF_3)_3$.

14. The lithium battery of claim 1, wherein an amount of the lithium salt that reacts with the residual water molecules in an organic solvent in the organic electrolytic solution to produce at least one of a protonic acid and a Lewis acid is about 0.01M to about 2.0M.

15. The lithium battery of claim 1, wherein the organic electrolytic solution comprises $LiPF_6$ and a lithium sulfonimide-based compound.

* * * * *